United States Patent Office 3,814,793
Patented June 4, 1974

3,814,793
PROCESS FOR DRYING CRIMPED POLYBENZIMIDAZOLE CONTINUOUS FILAMENTARY MATERIALS EMPLOYING MICROWAVE DRYING
Arthur E. Prince, Jr., and Kenneth S. Burns, Basking Ridge, N.J., assignors to Celanese Corporation, New York, N.Y.
No Drawing. Filed Mar. 31, 1972, Ser. No. 239,972
Int. Cl. D01f 3/10
U.S. Cl. 264—210 F         7 Claims

ABSTRACT OF THE DISCLOSURE

Polybenzimidazole continuous filamentary materials (e.g., monofilament and multifilament such as strand, cable, yarn, tow, etc.) which have been wet-crimped (e.g., steam-crimped) contain substantial quantities of residual moisture. The wet, crimped polybenzimidazole continuous filamentary material is subjected to an electric field having a frequency in the microwave range (i.e., above 890 megahertz) to remove the residual moisture in excess of the natural moisture regain level without disturbing the crimp of the material.

BACKGROUND OF THE INVENTION

Crimping of polymeric continuous filamentary materials, such as polybenzimidazole continuous filamentary materials is a well known methol for enhancing the processability of such materials and increasing their usefulness in textiles. Often, crimping is performed in a wet (i.e., steam) atmosphere. The resulting crimped materials contain substantial amounts of water in excess of the natural moisture regain level of the material. This excess water (i.e., water in excess of the natural moisture regain level) must be removed before further processing of the continuous filamentary materials can effectively be performed. Removal of excess water for most materials may be performed with heat. However, thermal removal of water from polybenzimidazole continuous filamentary materials is difficult and expensive. Polybenzimidazoles, unlike most other synthetic and natural fibers, have a relatively high natural moisture regain level, i.e., about 13 percent, at ambient conditions (i.e., at a temperature of about 70° F. and a relative humidity of about 65 percent).

Most polymeric materials have a relatively low natural moisture regain level. Polyethylene terephthalate, for example, has a natural moisture regain level of about 0.5 percent. Cotton has a natural moisture regain level of about 10 percent. Polybenzimidazole continuous filamentary materials oxidize readily with darkening and discoloration at elevated drying temperatures. The oxidized materials may also suffer a loss in physical properties. Removal of the contained moisture has generally been performed by drying with heat (e.g., electric ovens, muffle furnaces, hot rolls and the like). However, because of the oxidation problem, drying has to be performed at relatively low temperatures for relatively long times. For example, yarns are often wound upon bobbins and placed in furnaces at temperatures of about 100 to about 250° C. for about 2 to about 9 days or longer to dry the yarn sufficiently to remove the water in excess of the natural moisture regain level. This procedure is slow and adds considerable expense to the cost of the finished product. In addition, a large furnace area for relatively small amounts of material is required. This practice is thus generally unsatisfactory for commercial usage.

It has heretofore been proposed to utilize high frequency electric fields to hasten drying of synthetic fibrous polymeric materials such as polyesters, polyamides, polyolefins or polyacrylonitriles, all of which have relatively low natural moisture regain levels as compared with polybenzimidazoles. For example, British Pat. 1,192,397, discloses subjecting a tow of drawn, crimped polyethylene terephthalate filaments to a high frequency alternating electric field having a frequency of from 2 to 60 megacycles per second (i.e., from 2 to 60 megahertz). The high frequency electric field as disclosed therein induces sufficient heat within a tow of filaments to drive off the water present. While the utilization of a high frequency electric field substantially reduces the time necessary to dry a tow of filaments, the entire tow is heated to an elevated temperature with concomitant temperature control difficulties. Therefore, this procedure would not appear to be suitable for use with materials which are readily oxidizable with increased discoloration at elevated temperatures, such as polybenzimidazoles, particularly when the readily oxidizable material contains large amounts (e.g., up to about 200 percent) of moisture.

Accordingly, it is an object of the present invention to provide a process for removing moisture in excess of the natural moisture regain level from polybenzimidazole continuous filamentary materials.

Another object is to provide a process for drying crimped polybenzimidazole continuous filamentary materials, which process has a substantially lessened tendency towards oxidation of the materials.

It is an object of this invention to provide a process for the manufacture of crimped polybenzimidazole continuous filamentary materials having an enhanced processability.

It is another object of the invention to provide an improved process for drying crimped polybenzimidazole continuous filamentary materials which can be performed in a relatively short time.

It is a further object of this invention to provide a process for drying crimped polybenzimidazole continuous filamentary materials which may be performed in a relatively short space and operating cycle as well as at a relatively low cost.

These and other objects, as well as the scope, nature and utilization of the invention will be apparent from the following detailed description and appended claims.

SUMMARY OF THE INVENTION

These and other objects of this invention are achieved by a process for drying crimped polybenzimidazole continuous filamentary materials which contain water in excess of the natural moisture regain level which comprises subjecting the said excess moisture-containing material to an electric field having a frequency in the microwave range to remove the water in excess of the natural moisture regain level of the material without disturbing the crimp of the material and without significant oxidation or discoloration of the material.

DESCRIPTION OF THE PREFERRED EMBODIMENT

The starting polymer

Polybenzimidazoles are a known class of heterocyclic polymers which consist essentially of recurring units of the following formulas I and II. Formula I is:

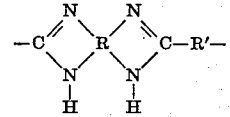

wherein R is a tetravalent aromatic nucleus, with the nitrogen atoms forming the benzimidazole rings being paired upon adjacent carbon atoms, i.e., ortho carbon atoms, of the aromatic nucleus, and R' is a member of the class consisting of an aliphatic (alkylene) group, a cycloaliphatic ring, an aromatic ring and a heterocyclic ring such as pyridine, pyrazine, furan, quinoline, thiophene, and pyran.

Formula II is:

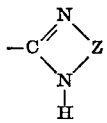

wherein Z is an aromatic nucleus having the nitrogen atoms forming the benzimidazole ring paired upon adjacent carbon atoms of the aromatic nucleus.

Preferably, the continuous filamentary materials are prepared from aromatic polybenzimidazoles, that is, from polymers consisting essentially of the recurring units of Formula II and of Formula I wherein R′ is an aromatic ring or a heterocyclic ring.

As set forth in the U.S. Pat. 3,174,947 and Reissue Pat. 26,065, which are incorporated herein by reference, the aromatic polybenzimidazoles having the recurring units of Formula II may be prepared by self-condensing a trifunctional aromatic compound containing only a single set of ortho-disposed diamino substituents and an aromatic, preferably phenyl, carboxylate ester substituent. Exemplary of polymers of this type is poly-2, 5(6)-benzimidazole prepared by the auto-condensation of phenyl-3,4-diaminobenzoate.

As also set forth in the above-mentioned patents, the aromatic polybenzimdazoles having the recurring units of Formula I may be prepared by condensing an aromatic tetraamine compound containing a pair of ortho-diamino substituents on the aromatic nucleus with a dicarboxyl compound selected from the class consisting of (a) the diphenyl ester of an aromatic dicarboxylic acid, (b) the diphenyl ester of a heterocyclic dicarboxylic acid wherein the carboxyl groups are substituents upon carbon in a ring compound selected from the class consisting of pyridine, pyrazine, furan, quinoline, thiophene and pyran and (c) an anhydride of an aromatic dicarboxylic acid.

Examples of aromatic polybenzimidazoles which have the recurring structure of Formula I and which may be formed into fibers or yarns include:

poly-2,2′-(m-phenylene)-5,5′-bibenzimidazole;
poly-2,2′-(pyridylene-3″,5″)-5,5′-bibenzimidabole;
poly-2,2′-(furylene-2″,5″)-5,5′-bibenzimidazole;
poly-2,2′-(naphthalene-1″,6″)-5,5′-bibenzimidazole;
poly-2,2′-(biphenylene-4″,4‴)-5,5′-bibenzimidazole;
poly-2,2′-amylene-5,5′-bibenzimidazole;
poly-2,2′-octamethylene-5,5′-bibenzimidazole;
poly-2,6-(m-phenylene) dimidazobenzene;
poly-2,2′-cyclohexenyl-5,5′-bibenzimidazole;
poly-2,2′-(m-phenylene)-5,5′-di(benzimidazole) ether;
poly-2,2′-(m-phenylene)-5,5′-di(benzimidazole) sulfide;
poly-2,2′-(m-phenylene-5,5′-di(benzimidazole) sulfone;
poly-2,2′-(m-phenylene)-5,5′-di(benzimidazole) methane;
poly-2′,2″-(m-phenylene)-5′,5″-di(benzimidazole) propane-2,2; and
poly-2′,2″-(m-phenylene)-5,5‴-di(benzimidazole ethylene-1,2 where the double bonds of the ethylene groups are intact in the final polymer.

The preferred aromatic polybenzimidazole fiber or yarn is one prepared from poly-2,2′-(m-phenylene)-5,5′-bibenzimidazole, the recurring unit of which is:

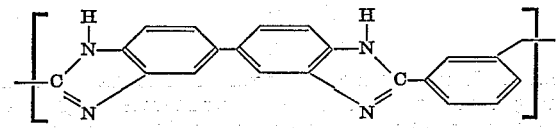

Any polymerization process known to those skilled in the art may be employed to prepare the polybenzimidazole which may then be formed into a continuous filamentary material. Preferred techniques used to prepare the polybenzimidazole are disclosed in U.S. Pats. 3,509,108 and 3,551,389, both assigned to the assignee of the present invention and both herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270 to 300° C. The reaction is conducted in a substantially oxygen-free atmosphere, i.e., below about 20 p.p.m. oxygen and preferably below about 8 p.p.m. oxygen, until a foamed prepolymer formed having an inherent viscosity, expressed as deciliters per gram, of at least 0.1, and preferably from about 0.13 to 0.3, the inherent viscosity (I.V.) as used in the present specification and claims being determined from a solution of 0.4 grams of the polymer in 100 ml. of 97 percent $H_2SO_4$ at 25° C.

After the conclusion of the first stage reaction, which normally takes at least 0.5 hours and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.6, e.g., 0.80 to 1.1 or more.

The temperature employed in the second stage is at least 250° C., preferably at least 325° C., and more preferably from about 350 to 425° C. The second stage reaction generally takes at least 0.5 hours, and preferably from about 1 to 4 hours or more.

A preferred method of preparing the polybenzimidazole is disclosed in the aforesaid U.S. Pat. 3,509,108. As disclosed therein, aromatic polybenzimidazoles may be prepared by initially reacting the monomer in a melt phase polymerization at a temperature above about 200° C. and a pressure above 50 p.s.i. (e.g., 300 to 600 p.s.i.) and then heating the resulting reaction product in a solid state polymerization at a temperature above about 300° C. (i.e., 350 to 500° C.) to yield the final product.

Preparation of the continuous filamentary material

The term "continuous filamentary material" as used herein is intended to include monofilaments and multifilaments such as strand, yarn, cable, tow, and the like.

As is well known, the polybenzimidazoles are generally formed into continuous filamentary materials by solution spinning, that is, by dry or wet spinning a solution of the polymer in an appropriate solvent such as dimethylacetamide, dimethylformamide, dimethylsulfoxide or sulfuric acid (used only in wet spinning) through an opening of predetermined shape into an evaporative atmosphere for the solvent in which most of the solvent is evaporated (dry) or into a coagulation bath (wet), resulting in the polymer having the desired shape.

The polymer solutions may be prepared in accordance with known procedures, For example, sufficient polybenzimidazole may be dissolved in the solvent to yield a final solution suitable for extrusion containing from about 10 to 45 percent by weight of the polymer, based on the total weight of the solution, preferably from about 20 to 30 percent by weight.

One suitable means for dissolving the polymer in the solvent is by mixing the materials at a temperature above the atmospheric boiling point of the solvent, for example 25 to 120° C. above such boiling point, and at a pressure of 2 to 15 atmospheres for a period of 1 to 5 hours.

Preferably, the polymer solutions, after suitable filtration to remove any undissolved portions, are dry spun. For example, the solutions may be extruded through a spinneret into a conventional type downdraft spinning column containing a circulating inert gas such as nitrogen, noble gases, combustion gases or superheated stream. Conveniently, the spinneret face is at a temperature of from about 100 to 170° C., the top of the column from about 120 to 220° C., the middle of the column from about 140 to 250° C., and the bottom of the column from about 160 to 320° C. After leaving the spinning column, the continuous filamentary materials are taken up, for example, at a speed in the range of from about 50 to 350 meters or more per minute. When the continuous filamentary materials are to be washed while wound on bobbins, the resulting "as-spun" materials may be subjected to a slight steam drawing treatment at a draw ratio of from about 1.05:1 to 1.5:1 in order to prevent the fibers from relaxing and falling off the bobbin during the subsequent washing step. Further details on a method of dry-spinning polybenzimidazole continuous filamentary materials are shown in U.S. Pat. 3,502,756 to Bohrer et al., assigned to the same assignee as the present application and herein incorporated by reference.

Desirably, the continuous filamentary materials are next washed so as to remove residual spinning solvent, e.g., so that the washed materials contain less than about 0.1 percent by weight solvent, based on the weight of the continuous filamentary material, and preferably so as to obtain an essentially spinning solvent-free continuous filamentary material. Typically, a simple water wash is employed; however, if desired other wash materials such as acetone, methanol, methyl ethyl ketone and similar solvent-miscible and volatile organic solvents may be used in place of or in combination with the water. The washing operation may be conducted by collecting the polybenzimidazole continuous filamentary material on perforated rolls or bobbins, immersing the rolls in the liquid wash bath and pressure washing, for example, for about 2 to 48 hours or more, depending upon the diameter of yarn package. The continuous filamentary material may also be washed in a continuous manner as a band or tow of multifilaments or many parallel yarns.

The washed continuous filamentary materials are dried to a low total moisture content and drawn in any suitable manner known to those skilled in the art. Drying and drawing may be conducted in accordance with the copending application of Arthur E. Prince, Ser. No. 239,898, entitled "Drying and Drawing Process for Polybenzimidazole Continuous Filamentary Materials," filed of even date herewith, assigned to the same assignee as the present invention and herein incorporated by reference. As disclosed therein, moisture-containing polybenzimidazole continuous filamentary material may be continuously passed in the direction of its length through a drying zone to reduce the moisture content of the material to a level at which the material may be drawn without substantially adversely affecting the tensile properties or color of the material. The dried material is continuously passed in the direction of its length to a drawing zone and is drawn while the material has the reduced moisture content.

Particularly preferred drawing techniques are disclosed in U.S. Pats. 3,622,660 of George F. Ecker and Thomas C. Bohrer and 3,541,199 of Thomas C. Bohrer and Arnold J. Rosenthal, both assigned to the same assignee as the present invention and both herein incorporated by reference. For example, the polybenzimidazole continuous filamentary materials may be hot drawn at high drawing speeds, that is, the speed of the supply roll may be on the order of 15 to 50 meters per minute or higher. The limiting factor of the drawing speed is the particular design of the drawing apparatus and the elastic properties of the fiber.

The polybenzimidazole continuous filamentary materials may be subjected to a hot drawing treatment in any convenient hot drawing apparatus or zone, for example, by passing the materials over a heated surface such as a hot roll, shoe, pin or plate, or by passing the materials through a radiantly heated zone such as a muffle furnace.

Preferably, the continuous filamentary material is passed immediately from the drying step into the hot drawing zone in order to minimize exposure of the heat treated material to the atmosphere.

Hot drawing is suitably conducted at a temperature of above about 350° C. up to about the degradation temperature of the polybenzimidazole continuous filamentary material, preferably from about 375 to 650° C., and more preferably from about 390 to 480° C.

The polybenzimidazole continuous filamentary materials may be drawn at any desired draw ratio below that at which they break, typically from above about 1.5:1 to 4.5:1 and preferably from about 2.5:1 to 3.5:1. The hot drawing residence time, i.e., the time during which the material is being heated, is usually from about 0.2 to 50 seconds, preferably 0.5 to 10 seconds, and more preferably 0.5 to 5 seconds. Substantially longer residence times at the elevated drawing temperatures may cause degradation.

Other suitable polybenzimidazole drawing techniques will be apparent to those skilled in the art.

The drawn continuous filamentary materials may be crimped in accordance with known crimping procedures. Generally, the materials are crimped in the presence of steam. Suitable wet- or steam-crimping apparatus is apparent to those skilled in the art. For example, U.S. Pat. 2,760,252 discloses a crimping chamber including means for injecting steam into the chamber. As noted therein, the filamentary material is folded over and crimped as it passes between the feed rolls and held compacted as it passes through the chamber under steam. The filamentary material is subjected to atmospheric steam at about 100° to 125° C. for a time sufficient to permanently set the crimp into the fiber. A model "C" stuffer box crimper made by the Turbo Machinery Co. of Lansdale, Pa., has been found acceptable. Other apparatus useful in wet-crimping polybenzimidazole continuous filamentary materials will be apparent to those skilled in the art.

After crimping, the continuous filamentary materials may be wound on the delivery rolls of a winding machine. Often, these crimped materials contain condensed water substantially in excess of the natural moisture regain level of polybenzimidazole. The steam-crimped polybenzimidazole continuous filamentary material can contain, for example, up to about 200 percent, often from about 25 to about 100 percent, by weight of the polybenzimidazole of moisture in excess of the natural moisture regain level (which corresponds to a moisture content of from up to about 213 percent, often about 38 to about 113 percent by weight of the polybenzimidazole on the dry basis.) This excess moisture should be removed prior to packaging of the crimped polybenzimidazole continuous filamentary material.

The excess moisture-containing, steam-crimped polybenzimidazole continuous filamentary material is passed into a drying zone wherein it is contacted with an electric field having a frequency in the microwave range (i.e., above about 890 megahertz and up to about 2500 megahertz) to remove substantially all of the moisture in excess of the natural moisture regain level.

Any suitable microwave frequency generating equipment sufficient to remove the excess moisture from the fibers may be utilized.

The steam-crimped continuous filamentary materials are subjected to the microwave electric field at a strength and for a time sufficient to remove the water in excess of the natural moisture regain level. The electric field has a frequency in the microwave range of from about 890 to about 2500 megahertz, preferably either from about 900 to about 930 megahertz or from about 2425 to about 2475 megahertz. The materials can be subjected to the microwave electric field for about 2 seconds to about 10 minutes, preferably from about 15 seconds to about 5 minutes. Generally, the higher the content of liquid in the materials, the longer the microwave electric field should be applied. These parameters may be suitably adjusted by the skilled artisan within the ranges as herein set forth to accomplish the most effective liquid removal for a given moisture-containing polybenzimidazole continuous filamentary material.

It has been found, for example, that uncrimped 600 denier/50 fil. polybenzimidazole yarn containing 56 percent moisture (dry basis) can be reduced to about 13 percent (the natural moisture regain level at 70° F. and 65 percent relative humidity) in about 3½ minutes contact with a 2450 megahertz electric field. A similar electric field applied to the same size yarn reduces 70.3 percent moisture to 13.5 percent in 5 minutes; 62.9 percent to 14.6 percent in 5 minutes; 67.6 percent to 9.7 percent in 9 minutes; 146 percent to 5.8 percent in 3 minutes; 177 percent to 12.6 percent in 30 seconds and 126 percent to 14.7 percent in 30 seconds. Similar reductions in the same time can be achieved using crimped yarn.

Contact with the electric field can be affected in a continuous manner by passing continuous, crimped lengths of polybenzimidazole continuous filamentary materials through a suitable microwave field generator having a wave applicator of a suitable size and shape. For example, continuous lengths of steam-crimped polybenzimidazole continuous filamentary materials can be passed into a device having a fringe-field-type microwave field applicator to evenly transmit the microwave field over the width of the fiber and also along a suitable length of the fiber. The device can also provide means to facilitate removal and disposal of the removed water, such as by forcing dry air or a suitable dry inert gas or the like through the device to carry off the removed water.

The crimped polybenzimidazole continuous filamentary materials may also be contacted with the electric field having a frequency in the microwave range while it is wound upon rolls or bobbins. The material in this embodiment need not be unwound.

Regardless, drying of the wet-crimped polybenzimidazole continuous filamentary material utilizing the process of the present invention offers substantial economies in processing time and equipment. Also, drying utilizing the process of the present invention is accomplished at relatively low temperatures (i.e., below about 150° C., usually below about 125° C.). In this manner, potential oxidation and/or discoloration of the polybenzimidazole continuous filamentary material is substantially decreased. In addition, the possibilities of unraveling of the crimped materials during drying is substantially lessened.

After the excess moisture has been removed by the process of the instant invention, the crimped polybenzimidazole continuous filamentary materials may be cut and fabricated into products.

The crimped polybenzimidazole continuous filamentary materials of the present invention are characterized by a high degree of thermal stability and show great resistance to degradation by heat, hydrolytic media and oxidizing media. They may be used, for example, in deceleration chutes for aircraft, chutes for re-entry capsules, high temperature dust collector bags, non-flammable clothing and fabrics, in space suits and flight clothing.

The invention is additionally illustrated in connection with the following example which is to be considered as illustrative of the present invention. It should be understood, however, that the invention is not limited to the specific details of the example.

EXAMPLE

A 600/50 yard (50 filaments making up a yarn having an overall denier of 600) of a polybenzimidazole yarn, namely, poly-2,2'-(m-phenylene)-5,5'-bibenzimidazole, is selected as an exemplary polybenzimidazole yarn for use in carrying out the process of this invention.

The polymer is formed into an "as-spun" yarn in the manner described in Example I of U.S. Pat. No. 3,502,756 to Bohrer et al. More particularly, a dope of dimethylacetamide containing 23 percent by weight of the polymer is extruded through a 50-hole jet into a dry spinning chamber containing superheated steam as the drying atmosphere.

The dry-spun yarn is wound on perforated bobbins, pressure-washed for 48 hours and dried at 150° C. for 7 days. The yarn is then drawn at 2:1 draw ratio at a temperature of 425° C. and steam-crimped in a Model "CC" stuffer box crimper manufactured by the Turbo Machinery Co. of Lansdale, Pa., at a steam temperature of 100° C. and atmospheric pressure. Excess, visible water is removed by shaking from the crimped yarn which, after shaking, contains about 180 percent water in excess of the natural moisture regain level.

The excess moisture-containing, crimped yarn while still wound upon the bobbins is subjected to an electric field having a frequency of 2450 megahertz for 30 seconds in a Model 4025 applicator device, available from Genesys Systems, An air atmosphere is used in the electric field. Temperature readings of the yarn during treatment with the electric field are obtained with a needle pyrometer and the yarn is essentially at a temperature of less than about 125° C. The thus-subjected yarn is removed from the electric field.

Samples taken along the length of the thus-subjected yarn show that the moisture content of the yarn is essentially at the natural moisture regain level. In addition, the crimped yarn does not appear to be substantially oxidized or discolored.

While we do not wish to be bound by theoretical considerations, it appears that the electric field having a frequency in the microwave range as utilized in the present invention heats essentially only the moisture contained therein. The moisture is thus heated to its boiling point nad driven off while the polybenzimidazole continuous filamentary material remains relatively cool. In this manner, the oxidation problem encountered upon heating polybenzimidazoles is significantly lessened.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

We claim:

1. A process for producing crimped, dried polybenzimidazole continuous filamentary materials which comprises:
    (a) drawing polybenzimidazole continuous filamentary material at a draw ratio of from about 1.5:1 to 4.5:1 at a temperature above about 350° C. up to about the degradation temperature of the polybenzimidazole continuous filamentary material for about 0.2 to 50 seconds;
    (b) introducing said drawn polybenzimidazole continuous filamentary material into a crimping zone in the presence of steam for a time sufficient to permanently set a crimp into said filamentary material;
    (c) recovering the resulting crimped polybenzimidazole continuous filamentary material from said crimping zone containing moisture in excess of the natural moisture regain level of polybenzimidazole;
    (d) drying said crimped polybenzimidazole continuous filamentary material by subjecting it to an electric field having a frequency above 890 megahertz for about 2 seconds to about 10 minutes to remove said moisture in excess of said natural moisture regain level; and, (e) thereafter recovering the resulting crimped, dried polybenzimidazole continuous filamentary material.

2. The process of claim 1 wherein said crimped polybenzimidazole continuous filamentary materials contain up to about 200 percent by weight of the material of moisture in excess of the natural moisture regain level.

3. The process of claim 2 wherein said electric field has a frequency of from about 890 to about 2500 megahertz.

4. The process of claim 2 wherein said electric field has a frequency of from 900 to about 930 megahertz and wherein said filamentary materials are maintained therein for about 15 seconds to about 5 minutes.

5. The process of claim 2 wherein the said electric field has a frequency of from about 2425 to about 2475 megahertz and wherein said filamentary materials are maintained therein for about 15 seconds to about 5 minutes.

6. The process of claim 3 wherein said drawn polybenzimidazole continuous filamentary material is crimped at a temperature of from about 100 to about 125° C. in the presence of steam.

7. The process of claim 6 wherein the polybenzimidazole continuous filamentary material subjected to drawing is a polybenzimidazole yarn.

References Cited

UNITED STATES PATENTS

| | | | |
|---|---|---|---|
| 2,402,609 | 6/1946 | Brabender | 28—62 |
| 2,433,842 | 1/1948 | Griffin | 28—62 |
| 2,483,933 | 10/1949 | Revercomb et al. | 34—1 |
| 2,490,938 | 12/1949 | Wiegerink | 34—1 |
| 2,698,488 | 1/1955 | Cannon et al. | 34—1 |
| 2,709,856 | 6/1955 | Hunter et al. | 34—1 |
| 3,485,984 | 12/1969 | Cerutti | 34—1 |
| 3,526,693 | 9/1970 | Rulison et al. | 264—210 Z |
| 3,584,104 | 6/1971 | Bohrer et al. | 264—210 |
| 3,619,453 | 11/1971 | Riggs | 264—210 |
| 3,657,411 | 4/1972 | Bohrer et al. | 264—204 |

FOREIGN PATENTS

| | | |
|---|---|---|
| 1,376,244 | 12/1914 | France. |

JAY H. WOO, Primary Examiner

U.S. Cl. X.R.

34—1; 264—25, 168, 184, 290